3,136,692
EFFERVESCENT COMPOSITION CONTAINING POLYVINYLPYRROLIDONE
Fred J. Bandelin, Lyndhurst, Ohio, assignor to Strong Cobb Arner, Inc., Cleveland, Ohio, a corporation of New York
No Drawing. Filed June 30, 1961, Ser. No. 120,957
6 Claims. (Cl. 167—57)

The present invention relates to compositions which effervesce and produce clear potable solutions when added to water together with procedure for preparing such compositions.

More particularly the invention concerns an anhydrous mixture of reactants which generate carbon dioxide in the presence of moisture and in which mixture there is incorporated polyvinylpyrrolidone having a molecular weight between 30,000 and 200,000. The polyvinylpyrrolidone serves a dual function in acting as a granulating agent when the compositions are to be prepared in the form of granules and as a lubricating binder when the compositions are compressed into tablets.

Compositions according to the present invention contain a solid organic acid having two or more carboxyl groups, a water-soluble metal carbonate compound and polyvinylpyrrolidone having a molecular weight between 30,000 and 200,000. The compositions also contain a therapeutic agent or a flavoring agent and they may be in either granule form or the granules may be compressed into tablets.

The solid organic acid is selected from the group consisting of tartaric acid, citric acid, malic acid, maleic acid, fumaric acid and succinic acid used singly or in any combination of two or more. The water-soluble metal carbonate compound is selected from the group consisting of sodium bicarbonate, sodium carbonate, sodium sesquicarbonate and potassium carbonate and may be used singly or in any combination of two or more. These components are used in dry powder form and are admixed whereby when such a mixture is added to water the ingredients react to produce carbon dioxide under effervescence and forming a carbonated saline drink. When it is desired that the drink be therapeutic, a suitable medicinal agent is incorporated therein such as one of the salicylates like sodium salicylate or acetylsalicylic acid (aspirin). When it is desired that the drink be flavored any suitable approved flavor agent is incorporated such as orange flavor or grape flavor. Thus granules and tablets of such dry compositions act as a carrier for various substances which are medicated drinks or flavored beverages.

Prior practices in the preparation of effervescent products, particularly compressed effervescent tablets, have encountered the serious difficulty in that there has been no single agent having both binding and lubricating properties and which is soluble both in water and in various organic solvents so that binding and lubricating agent can be accomplished without the use of the customary aqueous solutions while still conferring binding and lubricating properties and yielding a clear solution when added to water. It has long been recognized that such a single agent is highly desirable since it would make it possible to use the same as a binder dissolved in an essentially anhydrous organic solvent to effect granulation of the acid and base components. The present invention is predicated on the discovery that polyvinylpyrrolidone is such an agent and can be used in an essentially anhydrous system in which neither the acid nor the base is soluble to any material extent and in which little if any ionization occurs. By the use of polyvinylpyrrolidone a source can be used to granulate the acid and base components in the presence of each other without causing interaction or any appreciable liberation of carbon dioxide. Polyvinylpyrrolidone has thus very surprising and unexpected properties in the preparation of effervescent products together with the ability to produce a clear and attractive solution in water.

As is known, when compressed tablets are made according to conventional procedure lubricants must be added to the granulation to facilitate removal of the tablets from the die cavities of the automatic tableting machine after compression.

The usual lubricants employed in tablet making are stearic acid and other fatty acids, solid aliphatic alcohols, i.e., cetyl, and stearyl alcohols, metal stearates, talc, fatty acid esters and hydrogenated fats. These, however, are all insoluble in water and if used in effervescent products produce cloudy solutions when the products are dissolved in water and ordinarily leave insoluble residues which detract from the desired clear, sparkling solutions.

Polyvinylpyrrolidone has been found to be unique for the purposes of the present invention in that it is soluble in water and in a number of polar and non-polar organic solvents. This versatile solubility of polyvinylpyrrolidone is taken advantage of in the present invention and these advantages are particularly striking in the preparation of effervescent tablets because the polyvinylpyrrolidone serves both as a binder and as a lubricant. Because it is water-soluble and since no other lubricant need be added the solutions obtained when the tablets are dissolved in water are clear and free from any insoluble residue. It is used in an amount of about 0.2 to 10% of the dry weight.

The polyvinylpyrrolidone used in the present invention is a polymer of vinylpyrrolidone having a molecular weight between 30,000 and 200,000. It is not only soluble in water but is freely soluble in many organic solvents such as aliphatic alcohols, chlorinated hydrocarbons, esters, nitroparaffins and amines. It is also soluble although somewhat less so in ketones, ethers and unchlorinated hydrocarbons. The solvents for polyvinylpyrrolidone found to be particularly useful in the present invention include the lower aliphatic alcohols such as methyl, ethyl, propyl, isopropyl and butyl alcohols; ketones such as acetone and methylethyl ketone; chlorinated hydrocarbons such as methylene chloride, ethylene dichloride, trichloroethylene, 1,1,1-trichloroethane, 1,1,2-trichloroethane, chloroform, carbon tetrachloride and their ethane and methane derivatives containing both chlorine and fluorine atoms in their molecules. The polyvinylpyrrolidone may be used at any concentration in these solvents up to and including saturated solutions.

The invention is illustrated by the following non-limitative examples:

Example 1

| | Gms. |
|---|---|
| Sodium salicylate | 83 |
| Tartaric acid, dry powder | 180 |
| Citric acid, anhydrous | 250 |
| Sodium bicarbonate | 587 |
| Total | 1100 |

The powders are mixed together, moistened with a 10% solution of polyvinylpyrrolidone in anhydrous methanol, granulated through a number 8 mesh screen and dried at 110° F.

Example 2

| | Lbs. |
|---|---|
| Acetylsalicylic acid | 5 |
| Tartaric acid | 8 |
| Citric acid, anhydrous | 12 |
| Sodium bicarbonate | 20 |
| | 45 |

The mixed powders are moistened with a 10% solution of polyvinylpyrrolidone in 99% isopropanol, passed through a number 14 mesh screen and dried in a dehumidified area at 110° F. The resulting granules are compressed into tablets weighing 47.5 grains each.

Example 3

| | Gms. |
|---|---|
| Sodium sulfate, anhydrous | 250 |
| Sodium bicarbonate | 480 |
| Tartaric acid, dried powder | 170 |
| Citric acid, anhydrous | 245 |
| Flavor | 5 |
| | 1150 |

The powders are mixed, moistened with a 15% solution of polyvinylpyrrolidone in chlorothene (1,1,1-trichloroethane), granulated through a number 8 mesh screen and dried. One tablespoonful of the granules is dissolved in water for oral administration.

Example 4

| | Gms. |
|---|---|
| Potassium bromide powder | 100 |
| Potassium carbonate, anhydrous | 45 |
| Sodium bicarbonate | 405 |
| Tartaric acid, dry powder | 200 |
| Citric acid, anhydrous | 250 |
| | 1000 |

The mixed powders are granulated with a 10% solution of polyvinylpyrrolidone in isopropanol and dried at 110° F., and then used as such or compressed into tablets weighing 52.5 grains each.

Example 5

| | Gms. |
|---|---|
| Caffeine | 8 |
| Potassium bromide, powder | 83 |
| Potassium carbonate, anhydrous | 42 |
| Sodium bicarbonate | 587 |
| Tartaric acid | 180 |
| Citric acid, anhydrous | 250 |
| | 1150 |

The mixed powders are granulated with 10% polyvinylpyrrolidone in ethylene dichloride, passed through a mesh screen and dried at 120° F.

Example 6

| | | |
|---|---|---|
| Citric acid, anhydrous | 530 | lbs. |
| Sodium sesquicarbonate | 250 | lbs. |
| Sodium cyclamate | 118 | lbs. |
| Sodium saccharin | 11 lbs., | 14 oz. |
| Ascorbic acid, fine powder | 8 lbs., | 14 oz. |
| F.D and C. Yellow No. 6 | 3 lbs., | 14 oz. |
| Orange flavor solid, soluble | 70 lbs., | 6 oz. |
| | 990 lbs., | 48 oz. (3 lbs.). |

The powders are mixed well while blending in flavor and color, granulated with polyvinylpyrrolidone (8.8% in ethanol), dried at 110° F., and compressed into tablets weighing 2.5 gms. each.

Example 7

| | | |
|---|---|---|
| Tartaric acid | 555 lbs., | 5 oz. |
| dl-Malic acid | 30 lbs., | 8 oz. |
| Sodium bicarbonate | 260 | lbs. |
| Sodium carbonate, anhydrous | 54 | lbs. |
| Sodium cyclamate | 60 | lbs. |
| Sodium saccharin | 8 | lbs. |
| F.D and C. Red No. 2 | 5 | lbs. |
| F.D. and C. Blue No. 2 | 1½ | lbs. |
| Locked in solid, soluble grape flavor | 100 | lbs. |
| | 1073 lbs. | 21 oz. |

The powders are mixed well while blending in flavor and color, granulated with 7½% polyvinylpyrrolidone in chlorothene (1,1,1-trichloroethane), passed while moist through a number 14 screen, dried at 110° F. and compressed into tablets weighing 2.25 gms. each.

Example 8

| | Gms. |
|---|---|
| Acetyl-p-aminophenol | 85 |
| Tartaric acid | 66 |
| Citric acid, anhydrous | 540 |
| Sodium sesquicarbonate | 250 |
| Sodium cyclamate | 10.4 |
| Sodium saccharin | 2.2 |
| F.D and C. Yellow No. 1 | 5.4 |
| Lemon flavor, soluble | 41 |
| | 1000.0 |

The powders are mixed well, granulated with a 10% solution of polyvinylpyrrolidone in a mixture of 60 parts of chlorothene and 40 parts of methylene chloride and allowed to dry.

What is claimed is:

1. A composition which effervesces and produces a clear potable solution when added to water and which comprises an anhydrous mixture of at least one solid organic acid selected from the group consisting of tartaric acid, citric acid, malic acid, maleic acid, fumaric acid and succinic acid, at least one alkali metal carbonate compound, and polyvinylpyrrolidone having a molecular weight between 30,000 and 200,000.

2. A composition according to claim 1, in which there is incorporated a medicinal substance to produce a saline carbonated and medicated drink.

3. A composition according to claim 1, in which there is incorporated a flavoring agent to produce a flavored carbonated beverage.

4. A composition according to claim 1, in which the polyvinylpyrrolidone is present in an amount of 0.2 to 10% by weight.

5. A composition according to claim 4 which is in the form of compressed tablets and wherein the polyvinylpyrrolidone acts as a lubricating binder during tableting.

6. A composition which effervesces and produces a clear potable solution when added to water and which comprises an anhydrous mixture of at least one solid organic acid selected from the group consisting of tartaric acid, citric acid, malic acid, maleic acid, fumaric acid and succinic acid, at least one alkali metal carbonate compound selected from the group consisting of sodium bicarbonate, sodium carbonate, sodium sesquicarbonate and potassium carbonate, and polyvinylpyrrolidone having a molecular weight between 30,000 and 200,000.

References Cited in the file of this patent
UNITED STATES PATENTS

| | | |
|---|---|---|
| 2,540,253 | Gakenheimer | Feb. 6, 1951 |
| 2,820,741 | Endicott | Jan. 21, 1958 |

OTHER REFERENCES

U.S. Dispensatory, 25th Ed., 1955, Lippincott Co., Philadelphia, Pa., pages 1814 and 1815.